United States Patent [19]
Woodgate et al.

[11] Patent Number: 5,465,175
[45] Date of Patent: Nov. 7, 1995

[54] AUTOSTEREOSCOPIC DISPLAY DEVICE

[75] Inventors: Graham J. Woodgate; David Ezra, both of Oxfordshire, United Kingdom

[73] Assignee: Sharp Kabushiki Kaisha, Osaka, Japan

[21] Appl. No.: 150,369

[22] Filed: Nov. 10, 1993

[30] Foreign Application Priority Data

Nov. 11, 1992 [GB] United Kingdom .............. 9223652

[51] Int. Cl.$^6$ ............... G02B 27/22; G02B 27/12; G02F 1/1335
[52] U.S. Cl. ............... 359/463; 359/462; 359/464; 359/619; 359/621; 359/41
[58] Field of Search ................ 359/462, 463, 359/464, 619, 621, 626, 277, 48, 49, 41

[56] References Cited

U.S. PATENT DOCUMENTS

| | | | |
|---|---|---|---|
| 3,858,001 | 12/1974 | Bonne | 178/6.5 |
| 4,957,351 | 9/1990 | Shioji | 350/348 |
| 5,062,689 | 11/1991 | Koehler | 359/230 |
| 5,132,839 | 7/1992 | Travis | 359/462 |

FOREIGN PATENT DOCUMENTS

| | | |
|---|---|---|
| 0262955 | 4/1988 | European Pat. Off. . |
| 0354851 | 2/1990 | European Pat. Off. . |
| 0389842 | 10/1990 | European Pat. Off. . |
| 1273062 | 5/1972 | United Kingdom . |
| 2206763 | 1/1989 | United Kingdom . |
| 2252175 | 7/1992 | United Kingdom . |

OTHER PUBLICATIONS

Office Action issued Feb. 8, 1993 by British Patent Office for application GB 9223652.0.
Search Report for European Appl. 93308821.3 mailed Mar. 8, 1994.

Primary Examiner—Paul M. Dzierzynski
Assistant Examiner—Audrey Y. Chang
Attorney, Agent, or Firm—Renner, Otto, Boisselle & Sklar

[57] ABSTRACT

An auto stereoscopic 3D display comprises a hybrid sandwich comprising a first lenticular screen, a spatial light modulator, a diffuser, and second lenticular screen. A plurality of light sources produce in turn divergent light beams which are modulated by the modulator with two interlaced views. The hybrid sandwich projects the views in different directions towards an observer. The different 2D views are thus visible from directions corresponding to the directions in which the views were captured during recording of a 3D image. Each eye of the observer sees a single view across the whole of the display.

21 Claims, 4 Drawing Sheets

AUTOSTEREOSCOPIC DISPLAY DEVICE

The present invention relates to a display. Such a display may be used as a non-holographic three-dimensional (3D) display which is capable of forming a 3D image of opaque moving objects.

A known type of 3D display creates an illusion of a 3D image to a human observer by displaying a plurality of two-dimensional (2D) images in sequence. Each of the 2D images comprises a view of an object from a particular direction and is replayed in that direction. The perceived quality of 3D images provided by such techniques improves as the size of the display is increased.

GB-A-2 206 763 discloses a stereoscopic display apparatus in which light, from a light source positioned in the focal plane of a converging lens, is converted into parallel rays of light before being passed through a spatial light modulator.

U.S. Pat No. 5,062,689 discloses a projection display in which light is modulated by a spatial light modulator and then imaged on a screen.

U.S. Pat No. 3,858,001 discloses a stereoscopic display apparatus in which first and second images are polarised in first and second directions, respectively. The viewer wears spectacles containing analysers so that each eye receives only a respective image.

GB-A-1 273 062 discloses a stereoscopic display apparatus in which an image on a CRT is displayed through an array of lenses or pin holes. British Patent Application No. 9210399.3 discloses a 3D display in which temporal and spatial multiplexing are used to provide an autostereoscopic 3D image. By combining temporal and spatial multiplexing, an increased number of 2D views can be provided. However, the number of 2D views is limited by the maximum update rate and resolution of presently available spatial light modulators (SLM).

When a display of this type is increased in size so as to provide a relatively large display, each eye of an observer located at a given position will not see the same 2D view across the whole of the screen. Instead, the eye will see juxtaposed vertical slices of two or more different views on the screen with each slice having a width which is dependent on the position of the observer with respect to the display and on the display optical geometry. Each eye sees a different set of view slices which would give the appearance of a 3D image. However, the view slices can cause problems in the perception of a 3D image.

If a limited number of 2D views is available because of limited SLM update rate and resolution, then there may be an insufficient number of view slices to fill the display while maintaining the correct imaging directions for each view, so that the observer sees a 3D image over only part of the display. Thus, the display size is limited by the maximum update rates and resolutions of presently available SLMs.

According to the present invention, there is provided a display for producing an autostereoscopic image, comprising at least one light source for producing a divergent beam of light, and a spatial light modulator comprising a plurality of light modulating cells for modulating light passing therethrough from the at least one light source in accordance with image data, characterised by: a first array of lenses or apertures arranged to receive the divergent light beam from the or each light source, each of the lenses or apertures being arranged to produce an image of the or each light source at a common image plane such that each image is laterally displaced by a respective predetermined amount from an optical axis of the corresponding lens or aperture and the respective predetermined amounts vary progressively across the common image plane; and a second array of lenses or apertures having a common object plane which coincides with the common image plane.

The apertures may be elongate. Preferably the first array of lenses or apertures is located between the at least one light source and the spatial light modulator. Alternatively, the spatial light modulator may be located between the at least one light source and the first array of lenses or apertures.

The lenses of the first and second arrays are preferably converging lenses. For instance, the first and second arrays may comprise lenticular screens, for instance in the form of a plurality of parallel elongate lenticules having cylindrical convergent properties. The at least one light source may comprise a linear array of light sources extending perpendicularly to the lenticules. Such an arrangement may be used to provide horizontal parallax. Where both horizontal and vertical parallax is required, the first and second arrays may comprise 2D arrays of lenses, for instance in the form of microlens arrays. The lenses may be of the spherical convergent type and the at least one light source may comprise a two dimensional array of light sources. In either case, the light sources may be illuminated one at a time sequentially by suitable control means. The or each light source may be contiguous with the or each adjacent light source.

The pitch of the lenses or apertures of the first array may be substantially equal to the pitch of the cells of the spatial light modulator. This pitch may be less than the pitch of the lenses or apertures of the second array, which may for instance be an integer multiple of the pitch of the lenses or apertures of the first array and the pitch of the cells of the modulator. A diffuser may be located between the modulator and the second array.

The diffuser is preferably located at or adjacent a common focal plane of the lenses of the second array, and at an image plane of the or each light source imaged by the lenses of the first array.

Alternatively, a field lens may be interposed between the first and second arrays.

An opaque barrier may be disposed between the modulator or diffuser and the second array for blocking transverse light paths.

It is thus possible to provide a display which is capable of being used as a large 3D display with each eye of an observer at a given position observing a single 2D view across the whole of the display. The eyes of the observer see different 2D views, thus giving the appearance of a 3D image. Such a display has many possible uses, for instance in television, computer aided design, medical imaging, video games, simultaneous 3D and 2D presentation, and virtual reality displays.

The invention will be further described, by way of example, with reference to the accompanying drawings, in which.

Like reference numerals refer to like parts throughout the drawings.

Figure 1:
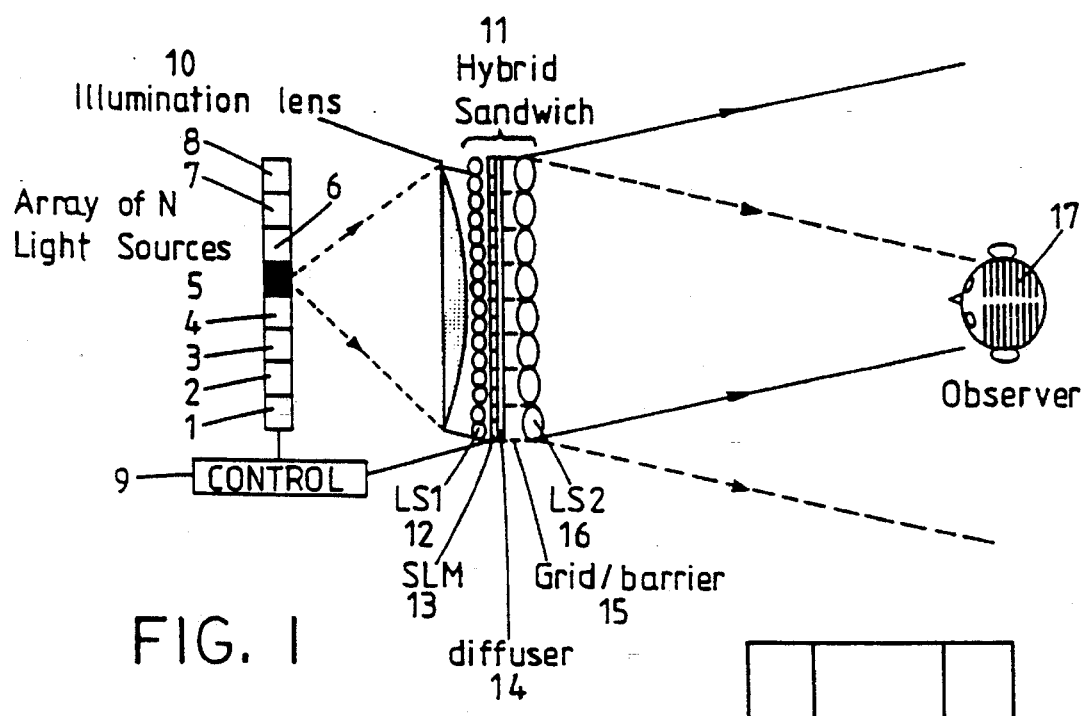
FIG. 1 is a diagrammatic plan view of a display of the type disclosed in British Patent Application No. 9210399.3.

The display shown in FIG. 1 comprises a linear array of N light sources 1 to 8 where N-8 in the arrangement shown. The light sources 1 to 8 are contiguous so as to form a continuous strip. The light sources are connected to a control circuit 9, which causes the light sources to be illuminated one at a time repetitively in order, FIG. 1 indicating that the light source 5 is illuminated. The linear array of light sources 1 to 8 is disposed in the focal plane of an illumination or collimating system 10, which is shown as a plano-convex lens having a cylindrical convex surface. The system 10 produces collimated light from each point of each of the light sources 1 to 8. Because the light sources have finite dimensions, the light output of the collimating system has a spread of angles.

Collimated light from the lens 10 is directed towards a hybrid sandwich 11 at an angle which is determined by which of the light sources 1 to 8 is presently illuminated. The hybrid sandwich comprises a lenticular screen (LS1) 12 formed by a plurality of contiguous cylindrical converging lens elements or lenticules having a horizontal pitch p. The screen 12 is followed by a SLM 13 in the form of a 2D liquid crystal device which is connected to the control circuit 9. The SLM 13 comprises a 2D array of picture elements whose light transmission properties (and colour transmission properties for a colour display) are controlled by the control circuit 9.

The SLM is followed by a diffuser 14 which is separated by a grid or barrier 15 for blocking lateral light paths from a further lenticular screen (LS2) 16. The screen 16 is similar to the screen 12 but has a horizontal pitch equal to Mp, where M is an integer greater than 1.

In use, the light rays from the illuminated light source 5 are collimated into parallel light rays by the system 10 and are focused by the screen 12 through the SLM 13 onto the diffuser 14. The picture elements of the SLM 13 are controlled by the control circuit so as to provide, for instance, two views of the image taken from different directions during image capture. The two views are interlaced such that alternate strip portions correspond to a respective one of the views.

The picture elements of the SLM 13 control the amount (and colour for a colour display) of light passing through the SLM so that a 2D array of images of the light source 5 is formed on the diffuser 14 corresponding to the two interlaced views. Each of the lenticules of the screen 16 converts the images on the diffuser 14 into output ray bundles whose angles of emission from the hybrid sandwich 11 depend on the lateral locations of the images on the diffuser 14 with respect to the optical axes of the lenticules. The two views represented on the SLM 13 are therefore visible from different angles corresponding to the angles of the object from which the views were taken during image capture. The grid or barrier 15 prevents each lenticule of the screen 16 from imaging the light images formed on the diffuser 14 and associated with adjacent lenticules of the screen 16.

After the light source 5 has been actuated for a predetermined time, the control circuit 9 deactivates the light source 5 and causes the SLM 13 to display the next pair of interlaced views. The next light source 4 is then activated and the screen 12 images the light through the SLM 13 onto regions of the diffuser 14 which are laterally displaced with respect to the images formed when the light source 5 is illuminated. Thus, the lenticular screen 16 provides output ray bundles directed at different angles corresponding to the directions of the view of the object during image capture.

This sequence of operation continues until each of the light sources of the linear array has been illuminated in turn, with the views represented on the SLM corresponding to a single "frame" of the 3D image. The whole sequence is then repeated for new sets of views representing consecutive frames constituting consecutive 3D images, the rate of repetition being sufficiently large to provide a substantially flicker-free image. The number of views making up each 3D image is equal to M×N. Although FIG. 1 shows a display capable of providing 16 views per image, practical SLMs may have refresh rates limited to 100 Hz so that, in order to provide a flicker-free image, the array of light sources may comprise only two sources. Similarly, practical SLMs may have resolution limits such that only two views at a time can be produced. Thus, the number of views per frame may be limited to four.

Figure 2:
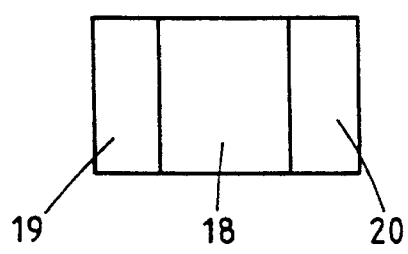
FIG. 2 illustrates the appearance of a large display of the type shown in FIG. 1 when seen with one eye of an observer.

It is intended that, for each given position of the observer within a region in front of the display for which a 3D effect is to be produced, each eye of the observer sees only one of the views across the whole display in the direction corresponding to that from which the 2D view was captured. However, for relatively large 3D displays, the limited resolution and frame rate of the SLM 13 and the optical geometry of the display can result in the appearance illustrated in FIG. 2. Thus, in a middle region 18 of the display, one eye of the observer sees part of a first view. However, at edge regions 19 and 20 of the display, the same eye of the observer sees parts of second and third different views. The view slices can cause problems in the perception of a 3D image.

Figure 3:
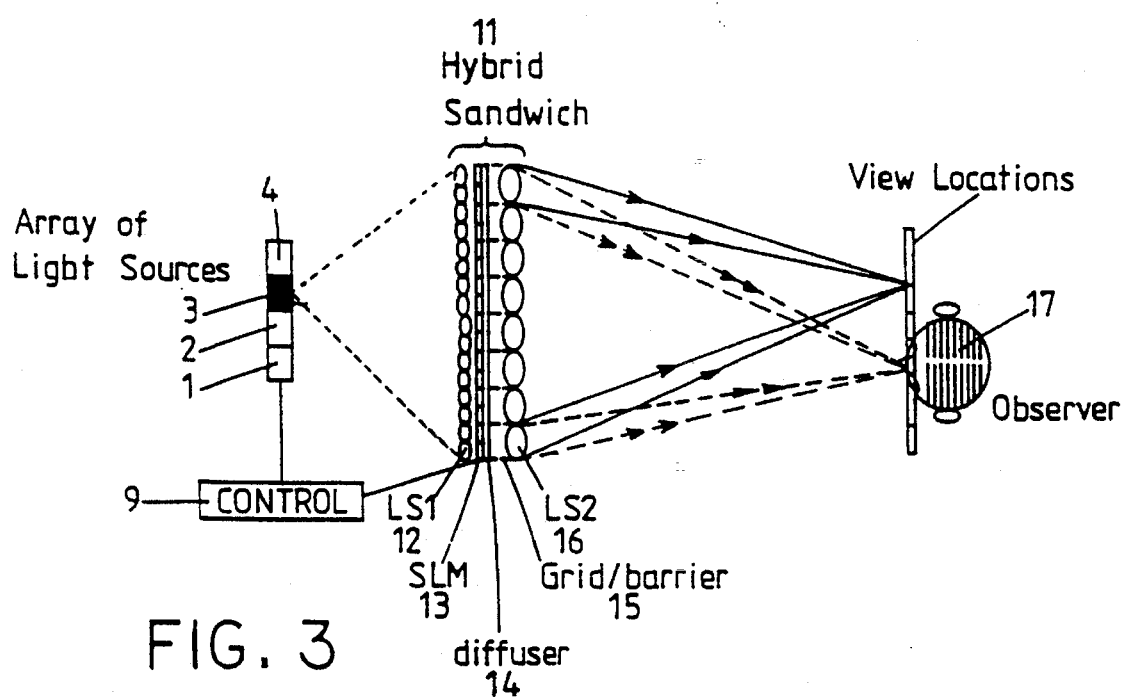
FIG. 3 is a diagrammatic plan view of a 3D display constituting a first embodiment of the invention.

The display shown in FIG. 3 differs from that shown in FIG. 1 in that the collimating system 10 is omitted. Also, the array of light sources is shown as comprising only four such sources 1 to 4. Otherwise, the control circuit 9 and the hybrid sandwich 11 are substantially identical to the corresponding parts of the display of FIG. 1.

Figure 4:
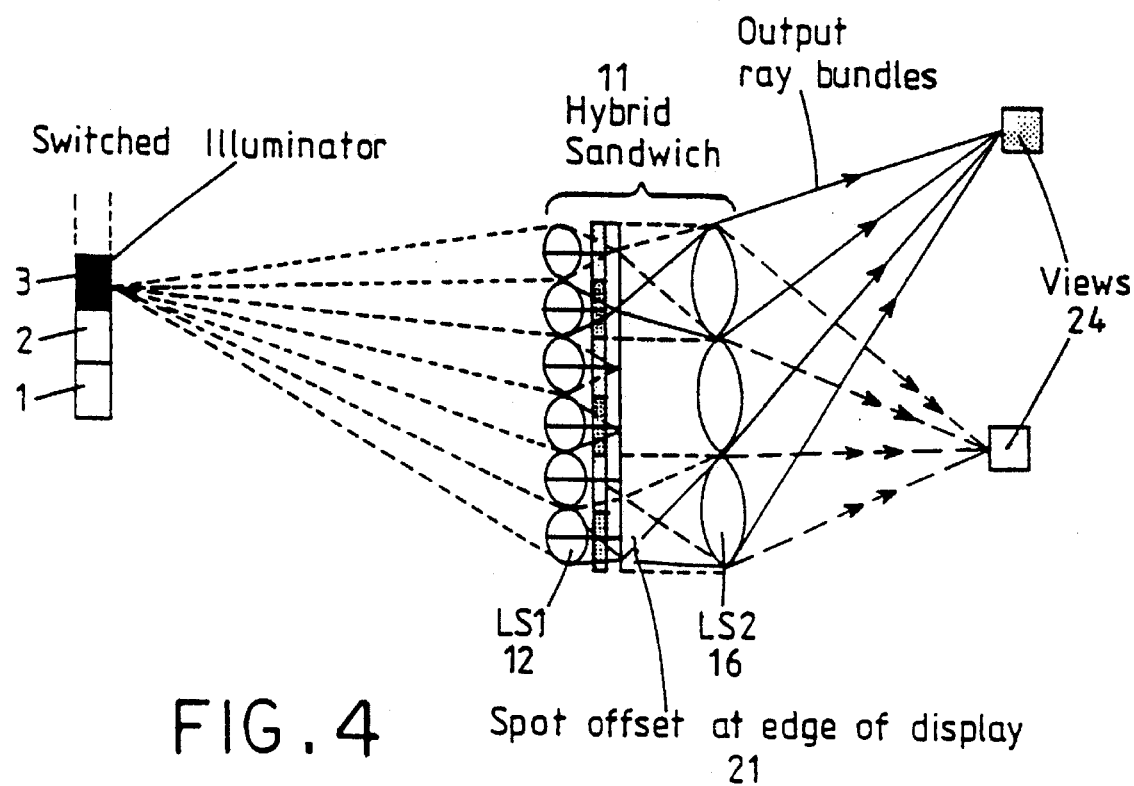
FIG. 4 illustrates diagrammatically part of the display of FIG. 3 in more detail.

In use, the control circuit 9 controls the light sources 1 to 4 and the SLM 13 as described with reference to FIG. 1. However, the hybrid sandwich 11 receives a divergent beam of light from each of the light sources 1 to 4, so that the light sources are imaged by the lenticules of the screen 12 through the SLM 13 onto different positions on the diffuser 14 located at an image plane of the first array. When each light source is illuminated, its image on the diffuser 14 is at the same position as in the display of FIG. 1 for the lenticule of the screen 12 on whose optical axis the light source is located, i.e. it has a lateral displacement of zero. For other lenticules, the light source image is laterally displaced progressively further towards the edge of the diffuser as the lateral distance of the lenticule from the abovementioned optical axis increases. This offset is illustrated at 21 In FIG. 4 with the light source 3 illuminated. The lateral displacement therefore varies progressively across the whole of the diffuser, changing sign when the normal from the illuminated light source to the diffuser is passed. Thus, the direction of light emerging from each lenticule of the screen 16 varies progressively across the display, so that each view of the interlaced pair of views is projected towards a single point instead of in a single direction as for the display of FIG. 1. Thus, an observer 17 will see a single but different 2D view with each eye over the whole of the display so that the appearance of a full screen 3D image will be produced. FIG. 4 illustrates at 24 the points or regions towards which the two views produced when the light source 3 is illuminated are projected.

The diffuser 14 may be replaced by a field lens.

Such an arrangement provides a limited region from which an observer may perceive the 3D effect. For instance, for a display of size 0.5 m with an observer located 1 m from the front surface, a display providing four views permits the observer to maintain a 3D image within a region which extends approximately 200 mm laterally on either side of a normal to the centre of the display and 260 mm in front of and behind the observer position. An SLM frame rate of 100 Hz permits a nonflickering image to be perceived.

When the first array is a parallax barrier, it no longer has a single image plane, but instead any plane parallel to the first array can be an image plane. Similarly, when the second army is a parallax barrier, any one of a plurality of planes parallel to the second array and between the first and second arrays may serve as an object plane.

Figure 5:
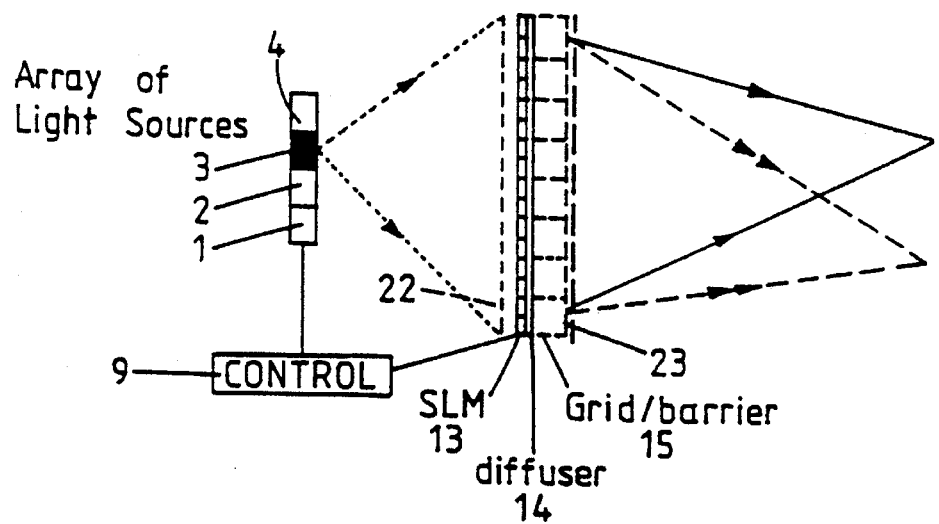
FIGS. 5, 6, 7, and 8 are diagrammatic plan views of 3D displays constituting second, third, fourth, and fifth embodiments, respectively, of the invention.

FIG. 5 illustrates a display which differs from that of FIG. 3 in that the lenticular screens 12 and 16 are replaced by parallax barriers 22 and 23, respectively.

Each of the barriers comprises a plurality of slits arranged perpendicularly to the axis of the array of light sources 1 to 4. The pitch of the slits of the barrier 22 is equal to the pitch of the elements of the SLM 13 , whereas the pitch of the slits of the barrier 23 is equal to twice that of the barrier 22. Operation of this display is the same as that of the display shown in FIG. 3.

Figure 6:
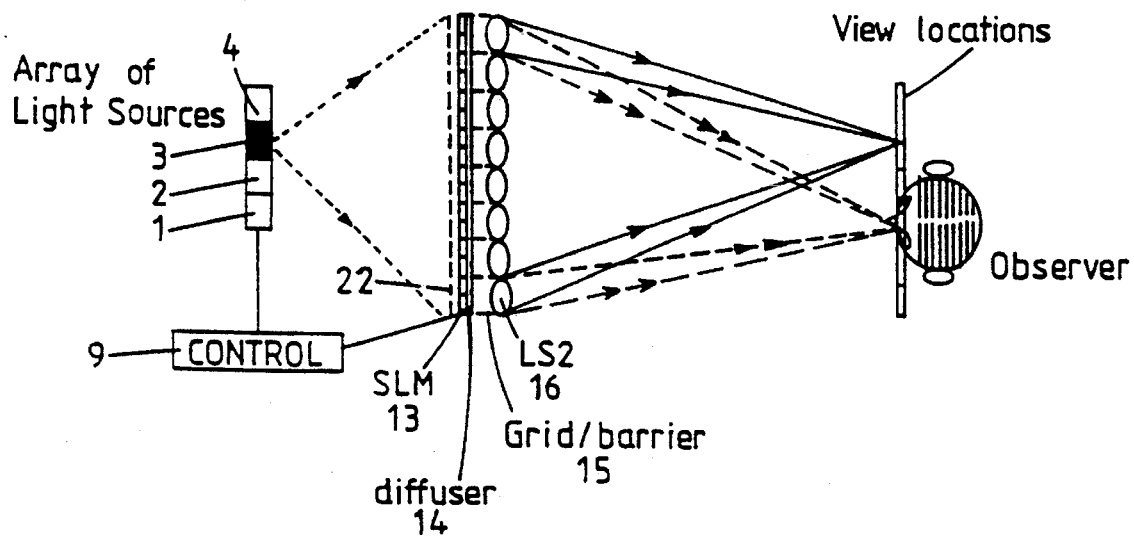

FIG. 6 shows a display which differs from that of FIG. 3 in that the lenticular screen 12 is replaced by a parallax barrier 22 of the type shown in FIG. 5. The display of FIG. 7 differs from that shown in FIG. 3 in that the lenticular screen 16 is replaced by a parallax barrier 23 of the type shown in FIG. 5. The operations of the displays of FIGS. 6 and 7 are the same as that of the display shown in FIG. 3.

Figure 8:
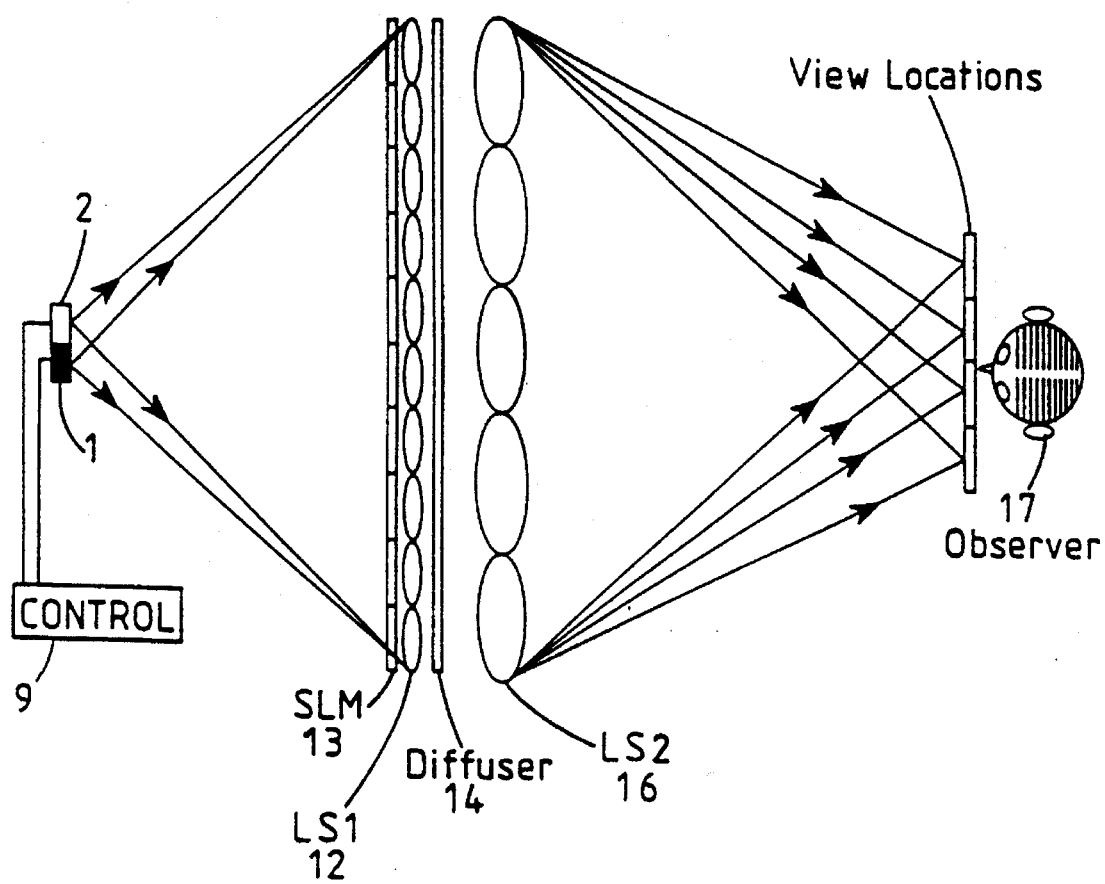

FIG. 8 shows a display; which differs from that of FIG. 3 in that the lenticular screen 12 follows the SLM 13 and in that the grid or barrier 15 has been omitted (although it may be included). The SLM 13 thus modulates the divergent light beams from the light sources 1, 2 (only two are shown in FIG. 8) and the modulated beams are imaged onto the diffuser 14 by the lenticular screen 12.

Figure 7:
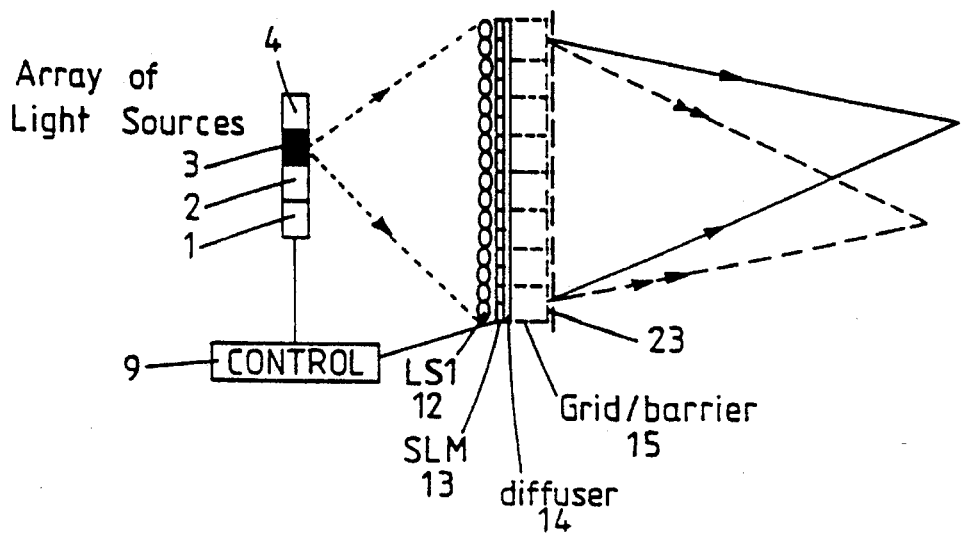

The lenticular screen 12 and/or the lenticular screen 16 may be replaced by a respective parallax barrier of the type shown in FIGS. 5 to 7. Although the lenticular screen 12 (or the parallax barrier) may be located behind the SLM 13 as shown in FIG. 8, it is at present preferred to place it in front of the SLM 13 as shown in FIGS. 3 to 7.

It is thus possible to provide a relatively large 3D display in which, from any point within a region from which the 3D effect may be viewed, each eye of an observer sees a single view extending across the whole of the display. This is achieved without the need to increase the frame rate or resolution of the SLM.

What is claimed:

1. A display for producing an autostereoscopic image, comprising:

at least one light source for producing a divergent beam of light;

a spatial light modulator comprising a plurality of light modulating cells for modulating light passing therethrough from the at least one light source in accordance with image data;

a first array of optical components arranged to receive the divergent light beam from the at least one light source, each of the optical components being arranged to produce an image of the at least one source at a common image plane such that each image is laterally displaced by a respective predetermined amount from an optical axis of the corresponding optical component and the respective predetermined amounts vary progressively across the common image plane; and a second array of optical components having a common object plane which coincides with the common image plane.

2. A display as claimed in claim 1, wherein the first array of optical components is located between the at least one light source and the spatial light modulator.

3. A display as claimed in claim 1, wherein the spatial light modulator is located between the at least one light source and the first array of optical components.

4. A display as claimed in claim 1, wherein the optical components of the first array are converging lenses.

5. A display as claimed in claim 1, wherein the optical components of the second array are converging lenses.

6. A display as claimed in claim 4, wherein the optical components of the second array are converging lenses, and the first and second arrays comprise first and second lenticular screens, respectively.

7. A display as claimed in claim 6, wherein each of the first and second lenticular screens comprises a plurality of parallel elongate lenticules having cylindrical convergent properties.

8. A display as claimed in claim 7, wherein the at least on light source comprises a linear array of light sources extending perpendicularly to the lenticules.

9. A display as claimed in claim 4, wherein the optical components of the second array are converging lenses, end the first end second arrays comprise first and second two dimensional arrays of lenses, respectively.

10. A display as claimed in claim 9, wherein the optical components of the first and second arrays have spherical convergent properties.

11. A display as claimed in claim 9, wherein the at least one light source comprises a two dimensional array of light sources.

12. A display as claimed in claim 1, wherein the pitch of the optical components of the first array is substantially equal to the pinch of the light modulating cells of the spatial light modulator.

13. A display as claimed in claim 12, wherein the pitch of the optical components of the second array is greater than the pitch of the optical components of the first array.

14. A display as claimed in claim 13, wherein the pitch of the optical components of the second array is substantially equal to the product of the pitch of the optical components of the first array and an integer greater than 1.

15. A display as claimed in claim 1, wherein a diffuser is disposed at the common image plane.

16. A display as claimed in claim 1, wherein a field lens is disposed at the common image plane.

17. A display as claimed in claim 1, wherein the spatial light modulator comprises a liquid crystal device.

18. A display as claimed in claim 1, wherein the at least one light source comprises a plurality of light sources and in that each of the light sources is contiguous with the or each adjacent light source.

19. A display as claimed in claim 18, further comprising control means for sequentially illuminating the light sources.

20. A display as claimed in claim 19, wherein the control means is arranged to control the spatial light modulator in accordance with a plurality of sequentially presented images representing a frame of a three dimensional image, each image comprising at least one view.

21. A display as claimed in claim 1, wherein the optical components of the first array produce the image of the at least one light source by refracting the received divergent light beam.

* * * * *